(12) United States Patent
Truscott

(10) Patent No.: US 9,808,980 B2
(45) Date of Patent: Nov. 7, 2017

(54) COEXTRUSION FEEDBLOCK, COEXTRUSION PROFILING INSERT ASSEMBLY, AND METHODS OF OPERATION

(71) Applicant: Nordson Corporation, Westlake, OH (US)

(72) Inventor: Michael K. Truscott, Chippewa Falls, WI (US)

(73) Assignee: Nordson Corporation, Westlake, OH (US)

( * ) Notice: Subject to any disclaimer, the term of this patent is extended or adjusted under 35 U.S.C. 154(b) by 457 days.

(21) Appl. No.: 14/445,604

(22) Filed: Jul. 29, 2014

(65) Prior Publication Data
US 2016/0031145 A1 Feb. 4, 2016

(51) Int. Cl.
*B29C 47/06* (2006.01)
*B29C 47/14* (2006.01)
(Continued)

(52) U.S. Cl.
CPC ............ *B29C 47/124* (2013.01); *B29C 47/04* (2013.01); *B29C 47/06* (2013.01); *B29C 47/128* (2013.01);
(Continued)

(58) Field of Classification Search
CPC ..... B29C 47/04; B29C 47/06; B29C 47/0816; B29C 47/0828; B29C 47/0837;
(Continued)

(56) References Cited

U.S. PATENT DOCUMENTS 3,195,183 A 7/1965 Phillips
3,680,997 A 8/1972 Dukert et al.
(Continued)

FOREIGN PATENT DOCUMENTS

DE 19757827 A1 6/1999
DE 202004011742 U1 11/2004
(Continued)

OTHER PUBLICATIONS

EDI Advances, Special K Issue, No. 20, retrieved from the Internet [http://www.extrusiondies.com/newsletter.phtml] on Jul. 10, 2015, (2010) 6 pages, Extrusion Dies Industries, LLC, Chippewa Falls, Wisconsin.
(Continued)

*Primary Examiner* — Yogendra Gupta
*Assistant Examiner* — Joseph Leyson
(74) *Attorney, Agent, or Firm* — Baker & Hostetler LLP

(57) ABSTRACT

The invention provides a coextrusion feedblock having a flow adjuster, a viscosity compensation device, an actuator, a central extrusion conduit, and a coextrusion conduit. The invention also provides a coextrusion profiling insert assembly constructed to be mounted in a coextrusion feedblock. The insert assembly has a flow adjuster, a viscosity compensation device, and an actuator. The insert assembly when mounted in the feedblock has a coextrusion conduit extending between the flow adjuster and the viscosity compensation device. The actuator is adjustable to apply force to bend the viscosity compensation device and thereby adjust a gap height of the coextrusion conduit. Also provided is a method of operating a feedblock having a viscosity compensation device comprising a flex region, a central extrusion conduit, and a coextrusion conduit. Force is applied to bend the flex region of the viscosity compensation device and thereby adjust a gap height of the coextrusion conduit.

15 Claims, 10 Drawing Sheets

(51) Int. Cl.
*B29C 47/12* (2006.01)
*B29C 47/56* (2006.01)
*B29C 47/04* (2006.01)
B29C 47/08 (2006.01)
B29C 47/92 (2006.01)

(52) U.S. Cl.
CPC ............ *B29C 47/56* (2013.01); *B29C 47/085* (2013.01); *B29C 47/0816* (2013.01); *B29C 47/0828* (2013.01); *B29C 47/0837* (2013.01); *B29C 47/145* (2013.01); *B29C 47/92* (2013.01); *B29C 2947/926* (2013.01); *B29C 2947/92628* (2013.01); *B29C 2947/92695* (2013.01)

(58) Field of Classification Search
CPC ... B29C 47/085; B29C 47/124; B29C 47/128; B29C 47/145; B29C 47/56; B29C 47/92; B29C 2947/926; B29C 2947/92628; B29C 2947/92695
See application file for complete search history.

(56) References Cited

U.S. PATENT DOCUMENTS

| | | |
|---|---|---|
| 3,694,119 A * | 9/1972 | Scheibling ............ B29C 47/065 264/173.12 |
| 3,743,143 A | 7/1973 | Barney et al. |
| 3,761,211 A | 9/1973 | Parkinson |
| 3,792,945 A | 2/1974 | Randall |
| 3,877,857 A | 4/1975 | Melead |
| 4,152,387 A | 5/1979 | Cloeren |
| 4,197,069 A | 4/1980 | Cloeren |
| 4,344,907 A | 8/1982 | Herrington et al. |
| 4,439,125 A | 3/1984 | Dieckmann et al. |
| 4,533,308 A | 8/1985 | Cloeren |
| 4,600,550 A | 7/1986 | Cloeren |
| 4,695,236 A | 9/1987 | Predoehl et al. |
| 4,780,258 A | 10/1988 | Cloeren |
| 4,784,815 A | 11/1988 | Cloeren et al. |
| 4,789,513 A | 12/1988 | Cloeren |
| 4,839,131 A | 6/1989 | Cloeren |
| 5,066,435 A | 11/1991 | Lorenz et al. |
| 5,066,443 A | 11/1991 | Cloeren |
| 5,147,195 A | 9/1992 | Cloeren |
| 5,375,990 A | 12/1994 | Krupa et al. |
| 5,788,998 A | 8/1998 | Gross |
| 5,971,736 A | 10/1999 | Velluire |
| 6,017,207 A | 1/2000 | Druschel |
| 6,287,105 B1 | 9/2001 | Druschel et al. |
| 6,626,206 B1 | 9/2003 | Ulcei et al. |
| 7,384,254 B2 | 6/2008 | Rübhausen et al. |
| 7,641,462 B2 | 1/2010 | Ito et al. |
| 7,845,927 B2 | 12/2010 | Druschel et al. |
| 2006/0040009 A1 | 2/2006 | Rübhausen et al. |
| 2008/0138598 A1 | 6/2008 | Michel et al. |
| 2009/0194901 A1 | 8/2009 | Nakamura |
| 2013/0234359 A1 | 9/2013 | Ulcej et al. |
| 2015/0104535 A1 | 4/2015 | Truscott |

FOREIGN PATENT DOCUMENTS

| | | |
|---|---|---|
| EP | 0161812 A2 | 11/1985 |
| EP | 0781641 A2 | 7/1997 |
| JP | S5497663 A | 8/1979 |
| JP | H02286217 A | 11/1990 |
| JP | H05345347 A | 12/1993 |
| JP | H08112852 | 5/1996 |
| JP | H1170559 | 3/1999 |

OTHER PUBLICATIONS

EDI Advances, Issue No. 21, (2011) 6 pages, Extrusion Dies Industries, LLC, Chippewa Falls, Wisconsin.
Nordson Extrusion Dies Industries, "Adjustable Feedblock Boosts Productivity in Coextrusion by Fine-Tuning Layer Thickness Without Need for Flow Inserts", retrieved from the Internet [http://www.extrusiondies.com/news_literature.phtml] on Jul. 10, 2015 (Oct. 27, 2010) 1 page, Extrusion Dies Industries, LLC, Chippewa Falls, Wisconsin.
European Application No. 15176800.9: Extended European Search Report dated Jan. 29, 2016, 9 pages.

* cited by examiner

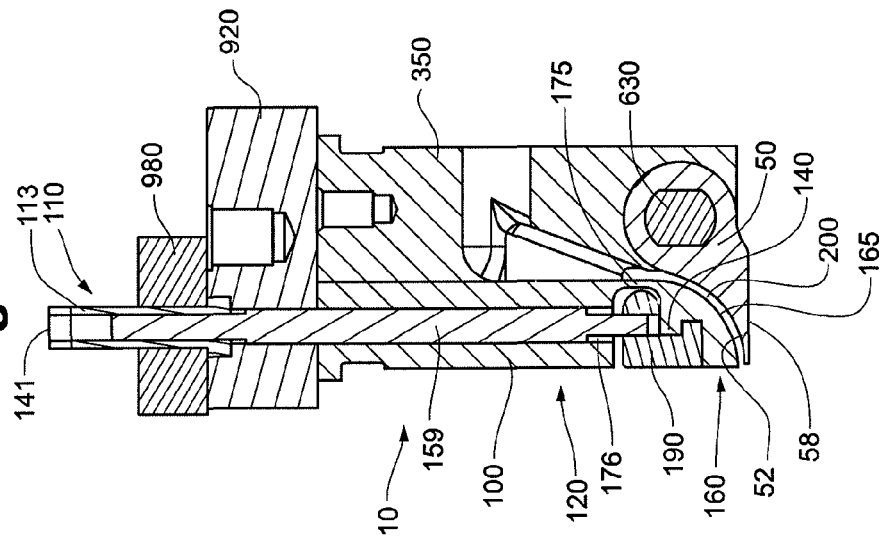
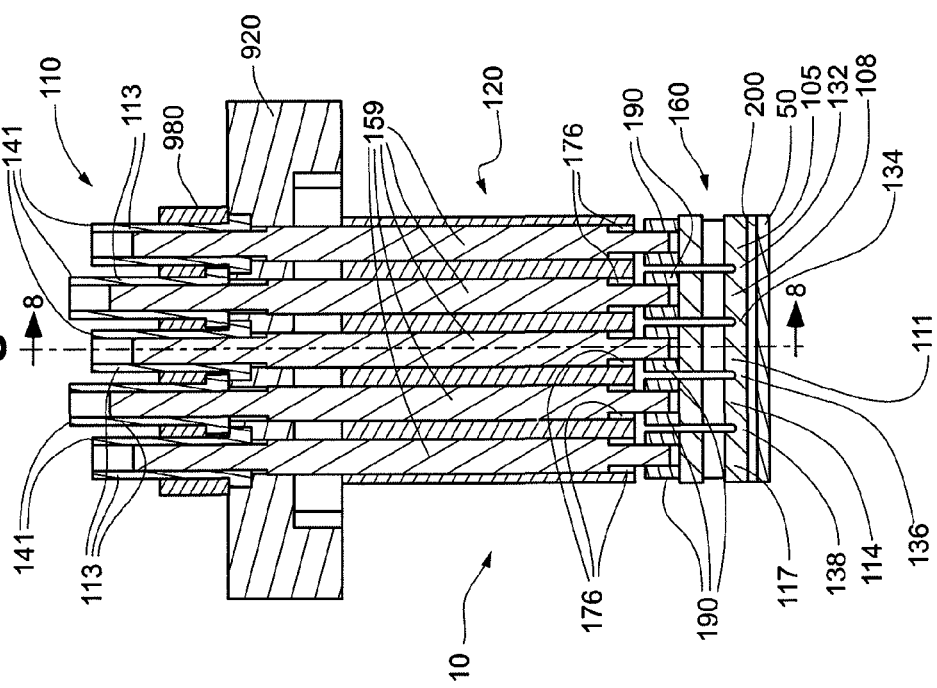

COEXTRUSION FEEDBLOCK, COEXTRUSION PROFILING INSERT ASSEMBLY, AND METHODS OF OPERATION

FIELD OF THE INVENTION

The invention relates generally to extrusion devices. More specifically, the invention relates to coextrusion feedblocks and methods of operating coextrusion feedblocks.

BACKGROUND OF THE INVENTION

Coextrusion feedblocks are used for bringing together molten streams of thermoplastic materials from multiple extruders. The individual streams from different extruders are brought together in the coextrusion feedblock to form particular layer arrangements. The resulting multi-layer extrudate flow is then delivered to a subsequent extrusion die, or another downstream tool, to produce the desired composite coextrusion structure.

In the process of bringing together multiple streams of different plastic materials, the different materials commonly have different properties. For example, different plastics tend to exhibit different viscosities. The variations in viscosity or other properties can adversely impact the layer uniformity of the resulting multi-layer coextrusion structure. To compensate for this, it is desirable to adjust the profile of one or more of the conduits through which the different streams pass. In the past, this has been attempted by using a variety of profiling components.

Existing profiling components have not been ideal for all applications. For example, some profiling components require off-line tuning, meaning extrusion must be stopped and the component removed and profiled by machining and polishing. Further, certain known profiling components have pronounced seams that align with the flow direction of the extrudate. In some cases, this may cause significant flow lines, depending on the type and configuration of the profiling component, the particular plastic materials used, and the application for which the profiling component is used. Still further, some known profiling systems offer less adjustability, and hence less control over profiling, than would be ideal for certain applications.

It would be desirable to provide coextrusion feedblocks and coextrusion profiling insert assemblies that address these and other problems associated with adjustable coextrusion feedblocks.

BRIEF DESCRIPTION OF THE DRAWINGS

The following drawings are illustrative of particular embodiments of the invention and do not limit the scope of the invention. The drawings are not necessarily to scale and are intended for use in conjunction with the explanations provided in the following detailed description. Embodiments of the invention will hereinafter be described in connection with the appended drawings, wherein like numerals denote like elements.

FIG. 7 is a cross-sectional view of the coextrusion profiling insert assembly of FIG. 4, showing components not illustrated in FIG. 4.

FIG. 8 is a cross-sectional view taken along lines A-A of the coextrusion profiling insert assembly of FIG. 7, shown with a control shaft for rotating a flow controller of the assembly.

SUMMARY OF THE INVENTION

In one embodiment, the invention provides a coextrusion feedblock for producing an extrudate, preferably one without flow lines. The feedblock comprises a flow adjuster, a viscosity compensation device having a flex region, an actuator in contact with the viscosity compensation device, a central extrusion conduit having a height, and a coextrusion conduit extending between the flow adjuster and the viscosity compensation device. The coextrusion conduit has a gap height, a width, and a length. The actuator is adjustable to apply a force to bend the flex region and thereby adjust the gap height of the coextrusion conduit without changing the height of the central extrusion conduit.

Another embodiment of the invention provides a coextrusion profiling insert assembly constructed to be mounted in a coextrusion feedblock having a central extrusion conduit with a height. The insert assembly has a flow adjuster, a viscosity compensation device comprising a flex region, and an actuator. The insert assembly when mounted in the coextrusion feedblock has a coextrusion conduit with a gap height extending between the flow adjuster and the viscosity compensation device. The actuator is adjustable to apply a force to bend the flex region and thereby adjust the gap height of the coextrusion conduit without changing the height of the central extrusion conduit.

In still another embodiment, the invention provides a method of operating a coextrusion feedblock having a viscosity compensation device comprising a flex region, a central extrusion conduit having a height, and a coextrusion conduit. The method comprises applying a force to bend the flex region of the viscosity compensation device and thereby adjust a gap height of the coextrusion conduit without changing the height of the central extrusion conduit.

DETAILED DESCRIPTION OF PREFERRED EMBODIMENTS

The following detailed description is exemplary in nature and is not intended to limit the scope, applicability, or configuration of the invention in any way. The description provides practical illustrations for implementing certain preferred embodiments of the invention. Examples of constructions, materials, dimensions, and manufacturing processes are provided for selected elements; all other elements employ that which is known to those of ordinary skill in the field of the invention. Those skilled in the present art will recognize that many of the given examples have a variety of suitable alternatives.

Figure 1:
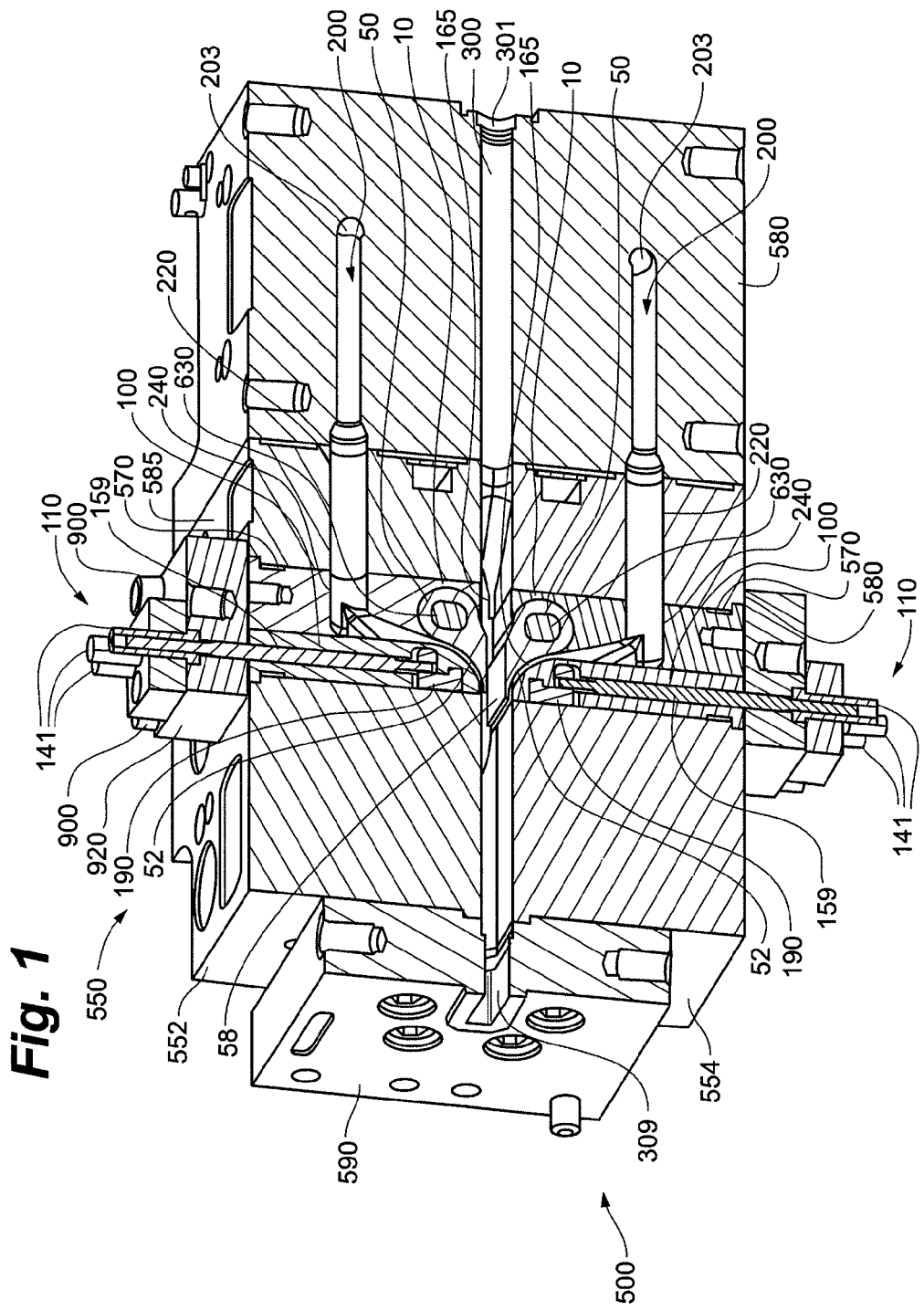
FIG. 1 is a cross-sectional view of a coextrusion feedblock in accordance with certain embodiments of the present invention.
Figure 2:
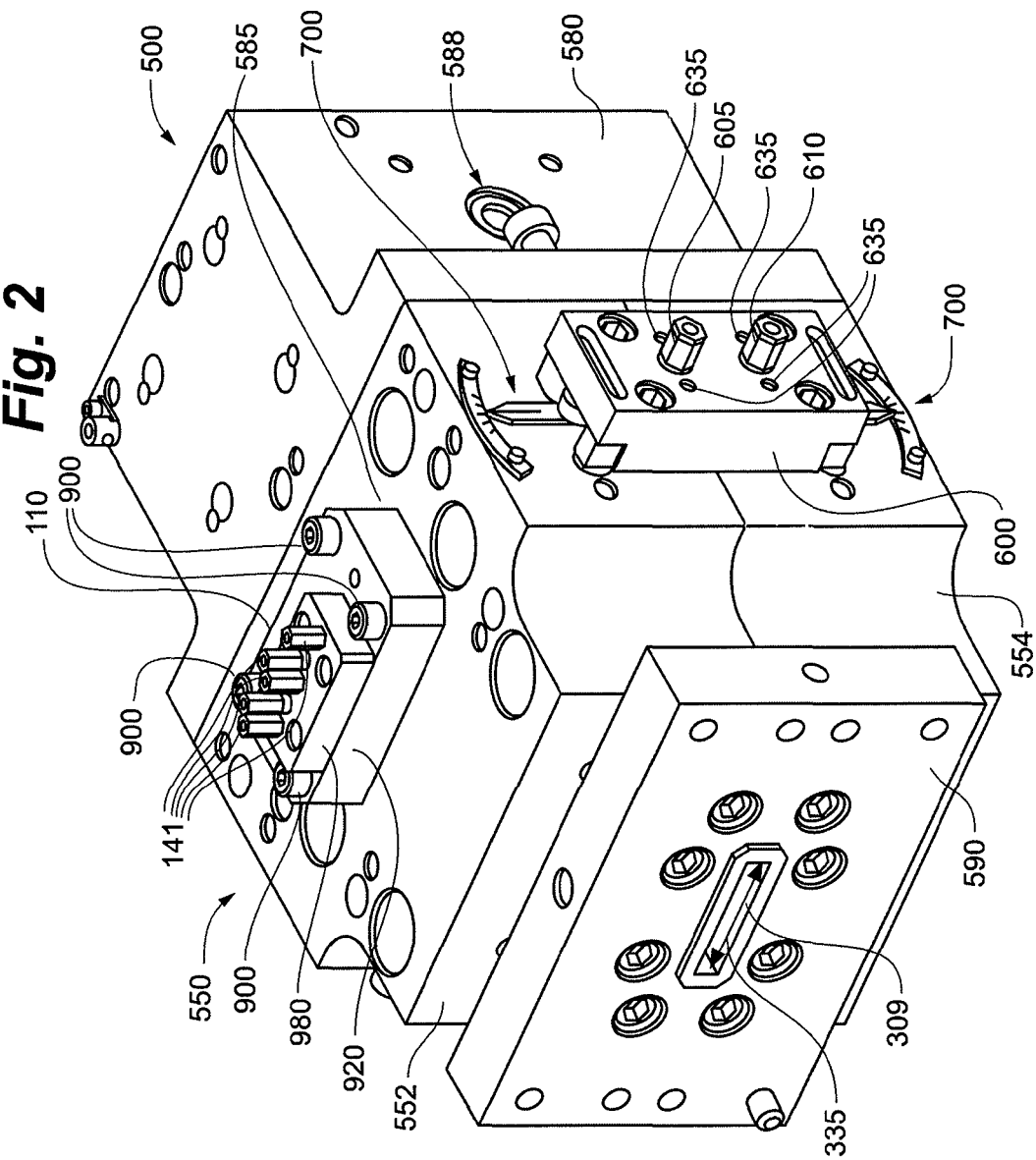
FIG. 2 is a perspective view of the coextrusion feedblock of FIG. 1.

One embodiment of the invention provides a coextrusion feedblock 500. Reference is made to FIGS. 1 and 2. The illustrated feedblock 500 has a housing 550, a central extrusion conduit 300, two coextrusion conduits 200, two flow adjusters 50, and two viscosity compensation devices 100.

The housing 550 of the illustrated feedblock 500 comprises first 552 and second 554 blocks joined together. In FIGS. 1 and 2, the central conduit 300 extends along a path located at an interface of these two blocks 552, 554. Thus, the two blocks 552, 554 collectively surround, and are each exposed to, the central conduit 300. In other embodiments, a single block can define both halves of the feedblock.

In the illustrated embodiment, the feedblock 500 further includes an intake block 580 through which an upstream section of the central conduit 300 passes. As shown in FIG. 1, the intake block 580 has an inlet 301 to which an extruder can be operably coupled to feed a supply of polymer into the central conduit 300. In the illustrated embodiment, the intake block 580 also has inlets 588 to which additional extruders can be operably coupled to feed supplies of polymer into the coextrusion conduits 200. It is to be appreciated that the inlets 301, 588 can be provided at various different locations on the feedblock. Moreover, a single inlet on the feedblock can alternatively be provided to supply polymer to both of the coextrusion conduits.

As shown in FIG. 1, upstream sections of the coextrusion conduits 200 pass through the intake block 580, and these upstream sections feed respectively into sections of the coextrusion conduits passing respectively through the first 552 and second 554 blocks of the feedblock 500. The illustrated feedblock 500 also has an output plate 590, although this is not required.

The configuration of the central extrusion conduit 300 can be varied to suit many different applications. In FIGS. 1 and 2, a single central conduit 300 extends along a straight path located in the middle of the feedblock 500. This, however, is by no means required. For example, the central conduit need not be located at the middle of the feedblock. Instead, it may be closer to the top or bottom of the feedblock. The central conduit may be curved or angled, although it will generally be desirable to minimize the flow resistance in the conduit. Moreover, in some cases, layers from one or more coextrusion conduits 200 are applied to one side, but not both sides, of the core layer delivered from the central conduit. In such cases, one or more coextrusion conduits are located on one side of the central conduit 300, but not on the other side.

In FIGS. 1 and 2, the coextrusion feedblock 500 has a single central conduit 300 and two coextrusion conduits 200. A feedblock of this nature will commonly be used to produce a 3-layer coextrusion structure. Skilled artisans will appreciate, however, that a single or double-layer coextrusion structure can be produced with such a feedblock 500. This can be done, for example, by not using and closing one or both of the coextrusion conduits 200. More generally, the number and arrangement of coextrusion conduits 200 can be varied to accommodate many different applications. The feedblock, for example, can alternatively have a single coextrusion conduit. As another example, when a 5-layer coextrusion structure is desired, the feedblock will typically have at least four coextrusion conduits. Many other variants of this nature will be readily apparent to skilled artisans given the present teaching as a guide.

The following disclosure describes various features of a coextrusion conduit 200. In cases where the feedblock 500 has multiple coextrusion conduits 200, the features discussed below for a coextrusion conduit 200 can optionally be present in each coextrusion conduit. The same is true for the descriptions herein of other components and features that are, or optionally can be, present in pairs or other multiples. The following description of a viscosity compensation device 100, for example, can optionally apply to each such device in cases where there are multiple viscosity compensation devices.

Figure 11:
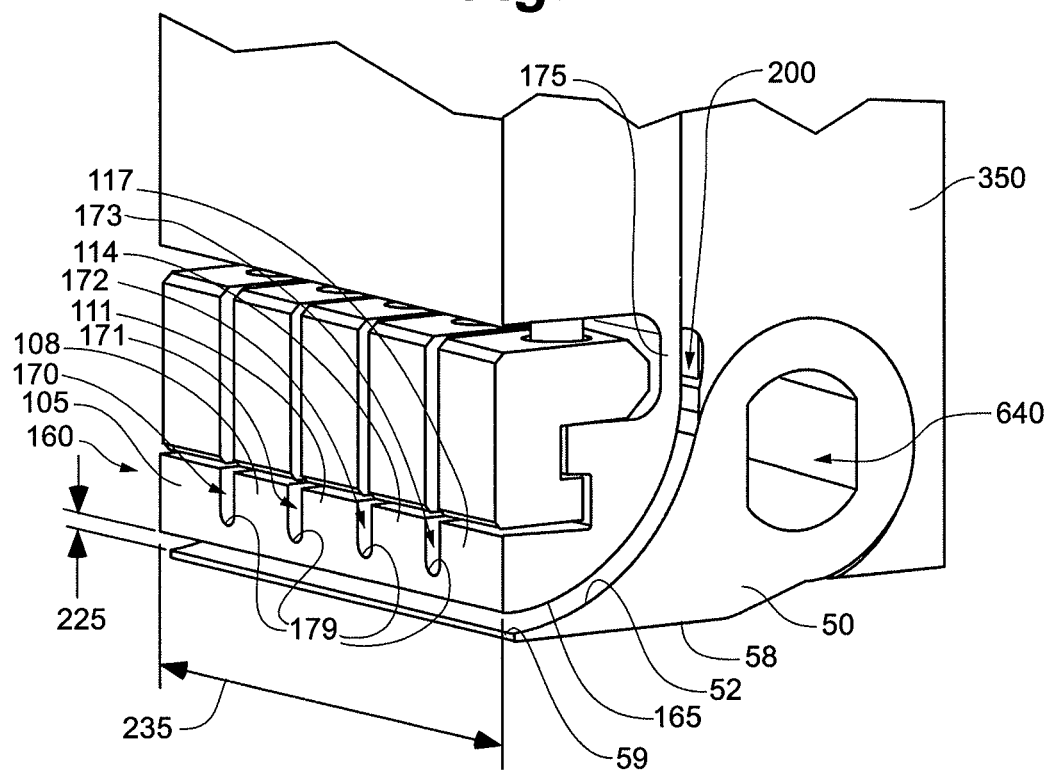
FIG. 11 is a perspective detail view of a flow-contacting region of the coextrusion profiling insert assembly of FIG. 4, showing components not illustrated in FIG. 4.

The coextrusion conduit 200 has a gap height, a width, and a length. FIG. 11 identifies the gap height by reference number 225; the width of the coextrusion conduit is identified by reference number 235. In the illustrated embodiment, the width 235 of each coextrusion conduit 200 is equal to the width 335 of the central conduit 300, at least where the coextrusion conduits intersect the central conduit. While this will commonly be the case, it is not required.

The illustrated feedblock 500 is configured such that the gap height 225 is adjustable, and can be set to be different at different locations along the gap width 235. Thus, the coextrusion conduit 200 is locally adjustable along its width 235.

Figure 4:
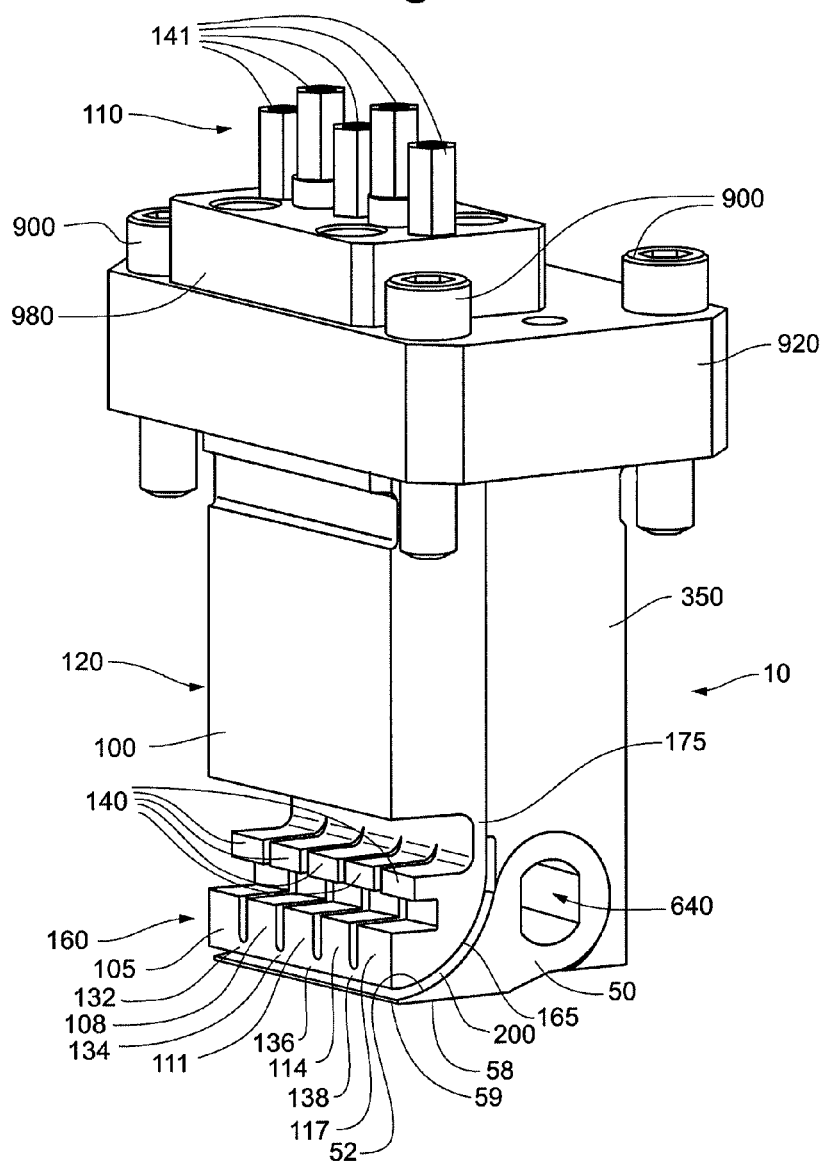
FIG. 4 is a perspective view of a coextrusion profiling insert assembly in accordance with certain embodiments of the invention, with certain components not shown in order to more clearly illustrate other components.
Figure 5:
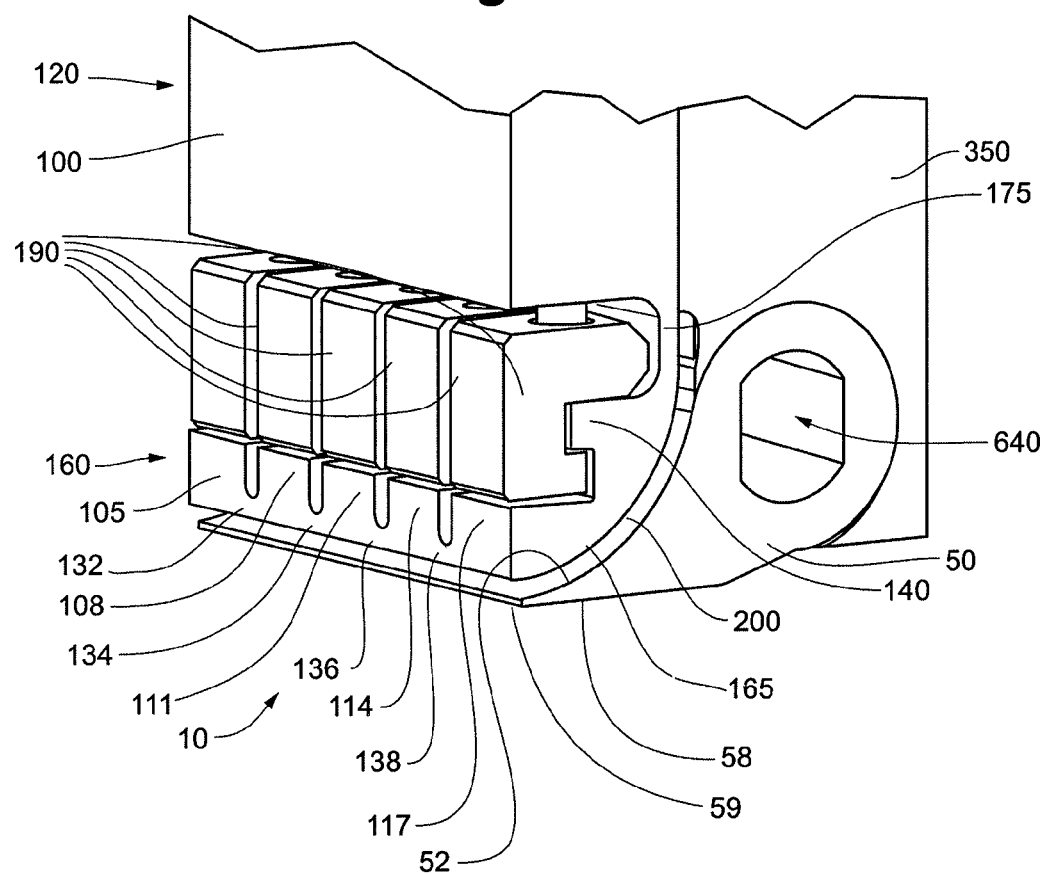
FIG. 5 is a perspective detail view of a flow-contacting region of the coextrusion profiling insert assembly of FIG. 4, showing components not illustrated in FIG. 4.

The feedblock embodiment shown in FIG. 1 includes two coextrusion insert assemblies 10. Each insert assembly 10 includes a viscosity compensation device 100 as well as a flow adjuster 50 and an actuator 110. The insert assembly 10 is shown in FIGS. 4 and 5. The manner in which the insert assembly 10 works, and the preferred structure of the insert assembly, is described in more detail on the following pages.

The coextrusion conduit 200 extends between the flow adjuster 50 and the viscosity compensation device 100. Reference is made to FIG. 1, which shows most of the length of the coextrusion conduit 200. Extrudate is fed into the feedblock 500 through an inlet region 203 of the coextrusion conduit 200. A primary section 220 of the coextrusion conduit 200 extends through the housing 550 of the feedblock 500, while a secondary section 240 extends through the coextrusion profiling insert assembly 10. In FIG. 1, a downstream extent of the secondary section 240 of each coextrusion conduit 200 extends alongside the viscosity compensation device 100. Thus, the viscosity compensation device 100 is exposed to the coextrusion conduit 200. In the illustrated embodiment, the two coextrusion conduits 200 change direction and converge toward each other, and toward the central conduit 300, within the coextrusion profile insert assemblies 10. Each coextrusion conduit, however, can be designed to follow different paths through the feedblock, depending on the desired or existing line layout.

In FIG. 1, each coextrusion conduit 200 opens into the central conduit 300, such that the secondary extrudate flow in each coextrusion conduit merges with the extrudate flow in the central conduit, thus producing a multi-layer extrudate flow. The layer delivered from the central conduit is referred to as the core layer. One or more layers from the coextrusion conduit(s) are layered onto the core layer. The resulting multi-layer extrudate flow moves along the remainder of the central conduit 300 until reaching the outlet 309. From the outlet 309, the multi-layer extrudate flow may be delivered to an extrusion die or another downstream tool, such as a layer multiplier or another feedblock.

The viscosity compensation device 100 is adjustable to change the gap height 225 of the coextrusion conduit 200, preferably without simultaneously changing a height of the central conduit 300. This is perhaps best seen by referring to FIGS. 1, 3, and 5. The viscosity compensation device 100 is adjustable to locally change the gap height 225 of the coextrusion conduit 200, such that the gap height can be different at different locations along the width 235 of the coextrusion conduit. The illustrated device 100 is adjustable to change the gap height 225 without having to remove the device from the feedblock 500. Thus, the viscosity compensation device 100 preferably is adjustable in situ (while it is mounted in its operable position in the feedblock).

The feedblock 500 preferably includes an actuator 110 in contact with the viscosity compensation device 100. In the embodiments illustrated, the actuator 110 includes a plurality of profiling members 141, a plurality of push/pull members 159, and plurality of lock members 190. It is to be understood, however, that the actuator 110 need not include all these components. The structure of the preferred actuator, and its manner of operation, are described in more detail on the following pages.

The actuator 110 is adjustable to apply a force to bend the flex region 175 of the viscosity compensation device 100 and thereby adjust the gap height 225 of the coextrusion conduit 200 without changing the height of the central extrusion conduit. In FIGS. 1 and 2, the feedblock 500 has an actuator 110 for each viscosity compensation device 100. Since the illustrated feedblock has two coextrusion conduits 200, each equipped with a viscosity compensation device 100, there are two actuators 110, located on opposite sides of the feedblock 500, to respectively control the two viscosity compensation devices 100. In the illustrated embodiment, each actuator 110 is externally accessible, such that each coextrusion conduit 200 can be profiled by an operator from outside of the feedblock 500 without having to stop operating the feedblock. As illustrated, each actuator 110 extends beyond the housing 550 of the feedblock 500.

The viscosity compensation device 100 has a flex region 175 configured to bend, and thereby adjust the gap height 225, in response to operation of the actuator 110. Preferably, the flex region 175 comprises a flexible neck extending between two larger regions of the viscosity compensation device 100. This is perhaps best seen in FIGS. 5 and 11, where the two larger regions respectively comprise a base region 120 and a flow-contact region 160. In the illustrated embodiment, a single block defines both the base region 120 and the flow-contact region 160. In other cases, two or more bodies are assembled together to collectively define the base 120 and flow-contact regions 160.

The flow-contact region 160 of the illustrated viscosity compensation device 100 has a convex flow-contacting surface 165 exposed to the coextrusion conduit 200, and the actuator 110 extends through the base region 120. The manner in which the actuator 110 extends through the base region 120 is shown in FIGS. 1, 7, and 8. During operation, extrudate moving through a coextrusion conduit 200 contacts the convex surface 165 of the respective viscosity compensation device 100.

In the illustrated embodiment, the flex region 175 is configured to bend about an axis that is substantially parallel to the width 235 of the coextrusion conduit 200. The narrow bendable neck of the illustrated flex region 175 spans the width of the viscosity compensation device 100 and of the coextrusion conduit 200. This, however, is not strictly required.

As shown in FIGS. 4-7 and 11, the viscosity compensation device 100 has a plurality of sections 105, 108, 111, 114, 117 located along the width 235 of the coextrusion conduit 200. Due to the individual sections, the viscosity compensation device 100 is adjustable to provide profiling of the coextrusion conduit 200 such that the gap height 225 is different adjacent to different sections. Thus, the viscosity compensation device 100 is adjustable to provide local profiling of the coextrusion conduit 200 over its width 235.

Figure 6:
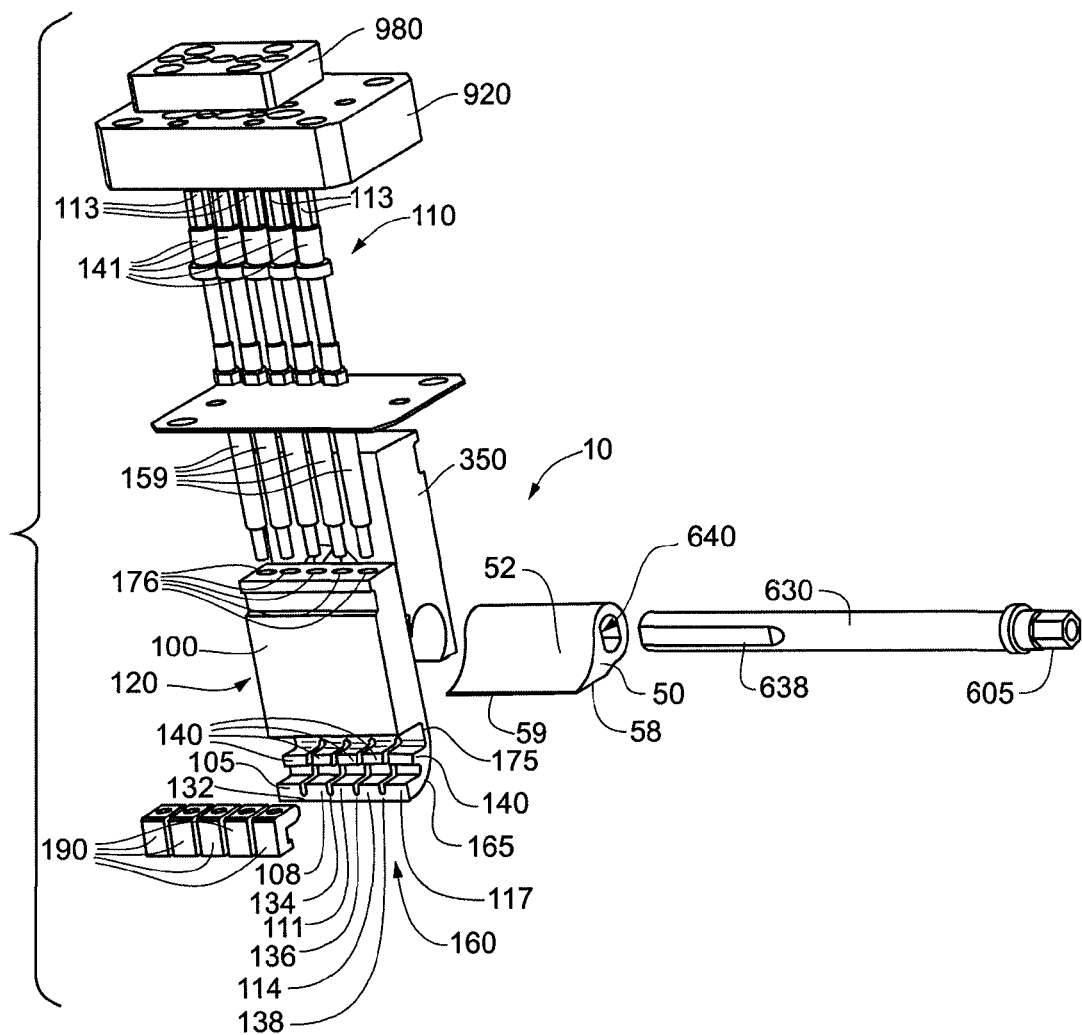
FIG. 6 is an exploded perspective view of the coextrusion profiling insert assembly of FIG. 4, shown with a control shaft for rotating a flow controller of the assembly.
Figure 9:
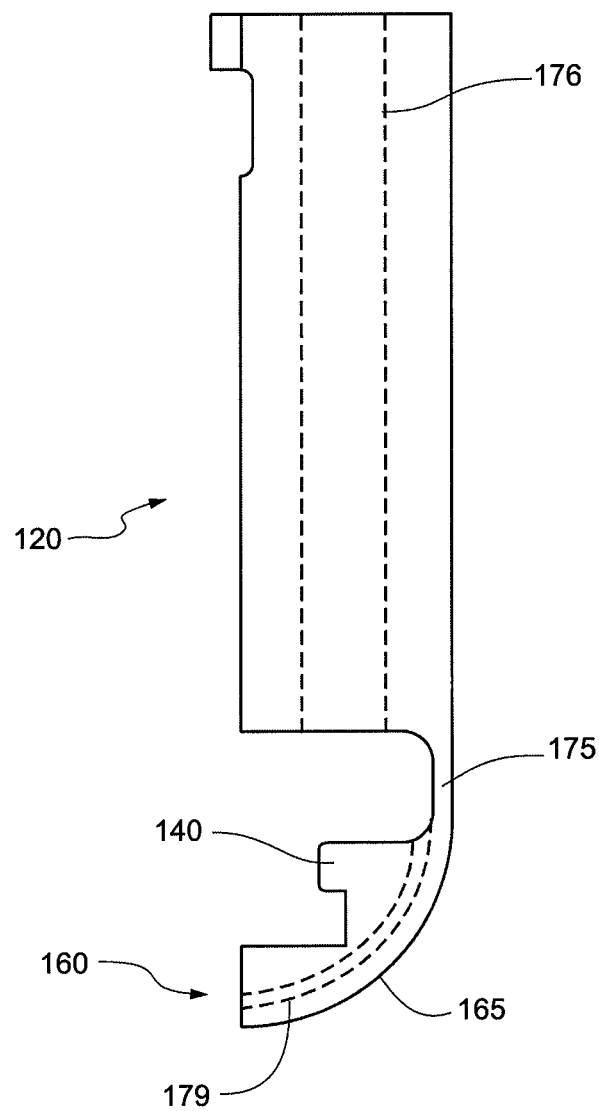
FIG. 9 is a side view of a flow-contacting component of the coextrusion profiling insert assembly of FIG. 4.

As is perhaps best shown in FIGS. 4 and 6, the different sections 105, 108, 111, 114, 117 of the illustrated viscosity compensation device 100 are all formed by a single body, rather than a series of discrete bodies. This single body preferably spans the width 235 of the coextrusion conduit 200, as is perhaps best appreciated by referring to FIGS. 1, 5, and 11. This is advantageous in that the viscosity compensation device 100 is devoid of seams that align with the flow direction of the extrudate. As a result, the device 100 presents a seamless flow surface 165, thereby streamlining flow through the coextrusion conduit 200 and reducing or eliminating defects like flow lines that may otherwise result.

The illustrated feedblock 500 has a flow adjuster 50, which preferably is rotatable and wedge shaped. In the illustrated embodiment, the flow adjuster 50 is rotatable to simultaneously change: i) the gap height 225 of the coextrusion conduit 200, and ii) a height of the central conduit 300.

The illustrated flow adjuster 50 has first and second flow-contacting surfaces. The first flow-contacting surface 58 is exposed to the central conduit 300, and the second flow-contacting surface 52 is exposed to the coextrusion conduit 200. The second flow-contacting surface 52 preferably has a concave configuration. In the illustrated embodiment, the viscosity compensation device 100 has a convex flow-contacting surface 165 that is exposed to the coextrusion conduit 200 and confronts the second flow-contacting surface 52 of the flow adjuster 50.

Thus, the illustrated embodiments provide a coextrusion conduit 200 having adjustable profiling components (i.e., the viscosity compensation device 100 and flow adjuster 50) on both sides of the coextrusion conduit. This provides exceptional flexibility and accuracy in profiling a wide variety of multi-layer coextrusions.

The viscosity compensation device 100 includes adjacent first 105 and second 108 sections connected to each other by a first flexible region (or "bend region") 132. Reference is made to FIGS. 4-7. The first flexible region 132 is configured to bend in response to the first adjustment section 105 moving closer to, or further from, the wedge-shaped flow adjuster 50 than is the second adjustment section 108. As is perhaps best understood with reference to FIGS. 5 and 11, the illustrated viscosity compensation device 100 has a groove 170 with a blind bottom 179 end located between the adjacent first 105 and second 108 sections, and the first flexible region 132 comprises a bendable neck located at the blind bottom end of that groove.

The situation is the same with respect to the other pairs of adjacent sections. That is, each two adjacent sections are connected to each other by a flexible region (or "bend region") that enables differential positioning of the two sections relative to the flow adjuster 50. Each of the illustrated flexible regions 132, 134, 136, 138 comprises a bendable neck located at the blind bottom end 179 of a groove 170-173.

Thus, it can be appreciated that the illustrated viscosity compensation device 100 has both: i) a flex region 175 configured to bend about a first axis that is generally parallel to the width 235 of the coextrusion conduit 200, and ii) a plurality of flexible regions (or "bend regions") 132, 134, 136, 138 configured to bend about respective axes each lying in a plane generally orthogonal to the first axis. Reference is made to FIG. 11. Thus, in response to operation of the actuator 110, the flex region 175 and at least one of the flexible regions 132, 134, 136, 138 simultaneously bend to adjust the profile of the coextrusion conduit 200. In the illustrated embodiment, a single body defines the flex region and the flexible regions.

Figure 3:
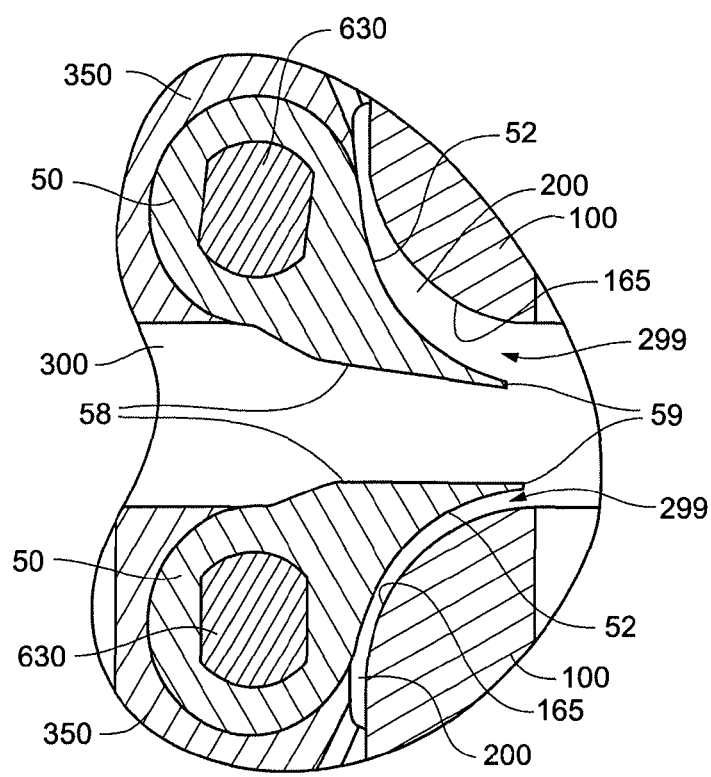
FIG. 3 is a broken-away cross-sectional detail view of a flow-combining region, where coextrusion conduits intersect a primary conduit, of the feedblock of FIG. 1.

The illustrated flow adjuster 50 has a cylindrical base region from which projects a wedge region that narrows with increasing distance from the cylindrical base region until reaching a tip 59 where the extrudate flows from the central conduit 300 and the respective coextrusion conduit 200 intersect. This is perhaps best shown in FIG. 3, which illustrates a flow-combining region of the feedblock 500 where two coextrusion conduits 200 merge with the central conduit 300. Each coextrusion conduit 200 has an outlet 299 that opens into the central conduit 300. Thus, the illustrated feedblock 500 has a flow-combining region where multiple extrudate flows are combined to form a multi-layer extrudate flow. In FIG. 3, the height of the central conduit 300 at a location entering the flow-combining region is set by the separation distance between the confronting pair of adjustable flow adjusters 50.

As is best appreciated by referring to FIGS. 1, 2, 3, 6, and 9, the illustrated flow adjuster 50 rotates in response to rotation of a control shaft 630. The resulting rotation of the flow adjuster 50 is about an axis that is substantially parallel to the width 235 of the coextrusion conduit 200. As best shown in FIG. 2, a proximal end 605, 610 of the control shaft 630 is externally accessible and can be rotated by an operator to rotate the control shaft, thereby rotating the flow adjuster 50. Thus, the proximal end 605, 610 of the control shaft 630 serves as a controller for the flow adjuster 50. The distal end 638 of the control shaft 630 has a polygonal exterior configuration matching the polygonal interior configuration of a key opening 640 in the flow adjuster 50. Thus, when the distal end 638 of the control shaft 630 is mounted within the key opening 640, the shaft and flow adjuster are keyed together for conjoint rotation.

In the embodiment illustrated, the flow adjusters 50 are independently adjustable. This is best appreciated by referring to FIGS. 1, 2, and 6. Each control shaft 630 extends from a proximal end 605, 610 located outside the feedblock, through the housing 550, and to a connection with the respective flow adjuster 50. In the illustrated embodiment, each flow adjuster 50 is configured to rotate in response to rotation of its respective control shaft 630. The resulting rotation of the flow adjuster 50 simultaneously changes the height of both the central conduit 300 and the respective coextrusion conduit 200; the height of the central conduit 300 increases while the gap height 225 of the respective coextrusion conduit 200 decreases, or vice versa.

In the illustrated embodiment, each flow adjuster 50 is configured to be locked against rotation once it has been adjusted to the desired rotational position. Each flow adjuster preferably has a lock system comprising a brake that, when engaged, restrains the respective control shaft against rotation. In FIG. 2, two lock screws 635 are adjacent to the proximal end 605, 610 of each control shaft 630. By loosening these lock screws, the respective flow adjuster 50 is released for rotation. The flow adjuster 50 can then be adjusted by rotating it to a desired rotational position, at which point by tightening the lock screws, a brake pad can be forced against the respective control shaft, thereby restraining it against rotation. It is to be appreciated that many other lock systems can be used.

In FIGS. 1 and 2, the actuators 110 for the viscosity compensation devices 100 are located on opposed top and bottom walls of the feedblock 500, while controllers 605, 610 for the flow adjusters 50 are located on opposed left and right side walls of the feedblock. This, however, is not required. The flow adjusters, for example, can alternatively have control shafts that extend from the top and bottom walls of the housing.

In embodiments having both the viscosity compensation device 100 and a rotatable flow adjuster 50, it is possible to adjust the profile of the coextrusion conduit 200 by bending the viscosity compensation device 100, by rotating the flow adjuster 50, or both. For example, a "course" adjustment of the gap height 225 can initially be made by rotating the flow adjuster 50, and subsequent "fine" adjustments of the profile of the coextrusion conduit 200 can be made by bending the viscosity compensation device 100.

In the illustrated embodiment, the flow adjuster 50 and the viscosity compensation device 100 are configured such that, when the gap height 225 is different adjacent to different sections 105, 108, 111, 114, 117 of the viscosity compensation device, the coextrusion feedblock 500 can be operated to produce a thermoplastic coextrusion structure devoid of flow lines (i.e., devoid of flow lines from the flow adjuster 50 or the viscosity compensation device 100). Thus, the invention provides a coextrusion feedblock 500 for producing an extrudate without flow lines (i.e., without flow lines from the flow adjuster 50 or the viscosity compensation device 100). To this end, the flow adjuster 50 preferably has a flow-contacting surface 52 that is exposed to the coextrusion conduit 200 and is seamless over the width 235 of the coextrusion conduit, while the viscosity compensation device 100 has a flow-contacting surface 165 that is exposed to the coextrusion conduit and is seamless over the width of the coextrusion conduit.

The term "seamless" is used herein to refer to a surface that is continuous over the width of the extrusion conduit to which the surface is to be exposed and is devoid of interfaces, cracks or other recesses, or protrusions, that create flow lines in extrudate passing against the surface. This can be accomplished, for example, when the flow adjuster 50 comprises a single integral body, which defines surface 52, spanning the width 235 of the coextrusion conduit 200, and the viscosity compensation device 100 comprises a single integral body, which defines surface 165, spanning the width of the coextrusion conduit. Reference is made to FIG. 6.

Referring to FIGS. 6 and 7, the illustrated actuator 110 comprises a plurality of push/pull members 159 attached to respective sections 105, 108, 111, 114, 117 of the viscosity compensation device 100. A first of the push/pull members 159 is moveable axially to selectively push or pull a first 105 of the sections, thereby changing the gap height 225 adjacent to the first adjustment section 105, and a second of the push/pull members is moveable axially to selectively push or pull a second 108 of the sections, thereby changing the gap height adjacent to the second adjustment section 108. The situation is the same with respect to the other push/pull members 159 shown in FIGS. 6 and 7.

In the illustrated embodiment, the push/pull members 159 are externally threaded and mounted in corresponding internally threaded bores, such that rotating the push/pull members in one direction moves them in a first axial direction, while rotating them in the other directions moves them in a second axial direction. This is perhaps best appreciated by referring to FIGS. 1, 7, and 8. The pitch of the mated exterior and interior threads provides sufficient resistance to the push/pull members being forced out of their set positions by pressure from polymer flowing through the coextrusion conduit.

The illustrated actuator 110 comprises a plurality of profiling members 141 accessible from outside of the coextrusion feedblock 500. The profiling members 141 preferably are rotatable to cause axial movement of respective push/pull members 159 of the actuator 110, thereby bending the viscosity compensation device 100 so as to change the gap height 225 adjacent to respective sections 105, 108, 111, 114, 117 of the viscosity compensation device. The illustrated profiling members 141 comprise hex caps that can be rotated, for example, using a wrench, socket, or other tool. The control of the profiling members can alternatively be mechanized using motors.

As shown in FIGS. 1, 5, 6, 7, 8, and 11, each push/pull member 159 is attached to a respective adjustment section 105, 108, 111, 114, 117 of the viscosity compensation device 100 by virtue of a lock member 190 that embraces a shoulder 140 of the respective adjustment section. The illustrated lock members 140 are generally C-shaped blocks, each having a recess in which is received the shoulder 140 of a respective adjustment section 105, 108, 111, 114, 117. The resulting interlocking configuration of each mated lock member 190 and shoulder 140 enables the push/pull members 159 to selectively push or pull the respective sections of the viscosity compensation device 100, thereby deforming the viscosity compensation device such that the profile of the coextrusion conduit 200 changes.

In the embodiment of FIGS. 1 and 2, the feedblock 500 has gauges 700 for the controllers 605, 610. Each gauge indicates the position of the respective adjustable flow controller 50. The illustrated gauges are merely exemplary; various different gauge types can be used. Moreover, the gauges are optional and may be omitted in some cases.

In another embodiment, the invention provides a method of operating a coextrusion feedblock 500 having a central extrusion conduit 300, a coextrusion conduit 200, and a viscosity compensation device 100 comprising a flex region 175. The method involves applying a force to bend the flex region 175 of the viscosity compensation device 100, thereby adjusting a gap height 225 of the coextrusion conduit 200, preferably without changing the height of the central extrusion conduit 300. In the present method, the force preferably is applied in response to an operator located outside of the coextrusion feedblock 500 operating the actuator 110, preferably without performing any disassembly of the feedblock. Thus, in preferred embodiments, the gap height 225 of the coextrusion conduit 200 can be adjusted without stopping extrusion. This delivers additional efficiencies to the manufacturer, thereby further supporting lean manufacturing initiatives.

The feedblock used in the present method can be of the nature described above with reference to FIGS. 1 and 2. Thus, the method can involve extruding a first flow of extrudate through a central conduit 300 while simultaneously extruding a second flow of extrudate through the coextrusion conduit 200. In such methods, the first flow and the second flow preferably are combined, at an intersection of the central conduit 300 and the coextrusion conduit 200, to produce a multi-layer extrudate flow.

In the present method, local profiling of the coextrusion conduit 200 is achieved by bending the viscosity compensation device 100, which may be of the nature described above in connection with FIGS. 1 and 2 and further described below with reference to FIGS. 4-11. In some applications, the method involves adjusting the gap height 225 of the coextrusion conduit 200 is different adjacent to different sections 105, 108, 111, 114, 117 of the viscosity compensation device. For example, an actuator 110 can optionally be operated to bend the flex region 175 of the viscosity compensation device 100 such that the gap height 225 of the coextrusion conduit 200 is different adjacent to different sections 105, 108, 111, 114, 117 of the viscosity compensation device. This allows the operator to compensate for layer uniformity problems, which may be caused by differences in the viscosity of the extrudate in the coextrusion conduit 200 compared to that of the extrudate in the central conduit 300. To achieve better layer uniformity, it may be desirable to locally adjust the profile of the coextrusion conduit 200 such that the gap height 225 is different at different locations along the width 235 of the coextrusion conduit.

The present method can optionally involve simultaneously adjusting the gap height 225 of the coextrusion conduit 200 and a height of the central conduit 300. As noted above, the illustrated feedblock 500 has a flow adjuster 50, which preferably is rotatable and wedge shaped. Thus, the method can optionally involve pivoting a flow adjuster 50 to simultaneously adjust the gap height 225 of the coextrusion conduit 200 and a height of the central conduit 300. The illustrated flow adjuster 50 has a first flow-contacting surface 58 exposed to the central conduit 300, and a second flow-contacting surface 52 exposed to the coextrusion conduit 200. The second flow-contacting surface 52 preferably has a concave configuration. In FIGS. 1 and 2, the viscosity compensation device 100 has a convex flow-contacting surface 165 that is exposed to the coextrusion conduit 200 and confronts the second flow-contacting surface 52 of the flow adjuster 50. The illustrated flow adjuster 50 is rotatable and driven. The viscosity compensation device 100, however, can alternatively be used in a feedblock where the flow adjuster is fixed, free floating, or omitted. For example, one or more of the flow adjusters 50 in a feedblock like that shown in FIGS. 1 and 2 could be free floating so as to pivot in response to an equilibrium pressure exerted by the mass flow rates of the extrudates in the central and coextrusion conduits. As another alternative, they can be adjustable by moving back-and-forth linearly, rather than being rotatable.

In some applications, the gap height 225 of the coextrusion conduit 200 is maintained different adjacent to different sections 105, 108, 111, 114, 117 of the viscosity compensation device 100. Yet operating the coextrusion feedblock 500 preferably produces a thermoplastic coextrusion structure devoid of flow lines (meaning there are no flow lines, visible to the naked eye, from the flow adjuster 50 or the viscosity compensation device 100). The flow adjuster 50 preferably has a flow-contacting surface 52 that is exposed to the coextrusion conduit 200 and is seamless over the width 235 of the coextrusion conduit, while the viscosity compensation device 100 has a flow-contacting surface 165 that is exposed to the coextrusion conduit and is seamless over the width of the coextrusion conduit. This can be accomplished, for example, when the flow adjuster 50 comprises a single integral body, which defines surface 52, spanning the width 235 of the coextrusion conduit 200, and the viscosity compensation device 100 comprises a single integral body, which defines surface 165, spanning the width of the coextrusion conduit. This is perhaps best appreciated by referring to FIGS. 1 and 6.

In some cases, the present method involves simultaneously bending at least one flexible region 132, 134, 136, 138 of the viscosity compensation device to provide differential positioning of two adjacent sections 105, 108, 111, 114, 117 of the viscosity compensation device. With the illustrated feedblock 500, for example, operating the actuator 110 to bend the flex region 175 of the viscosity compensation device 100 simultaneously bends at least one flexible region 132, 134, 136, 138 of the viscosity compensation device to provide differential positioning of two adjacent sections 105, 108, 111, 114, 117 of the viscosity compensation device relative to the flow adjuster 50. As noted above, the sections 105, 108, 111, 114, 117 of the illustrated viscosity compensation device 100 are all formed by a single body, which preferably spans the width 235 of the coextrusion conduit 200. This is advantageous in that the viscosity compensation device 100 is devoid of seams aligned with the extrudate flow direction. As a result, the device 100 presents a seamless flow surface 165, thereby streamlining flow and reducing or eliminating defects like flow lines that may otherwise result.

The illustrated viscosity compensation device 100 includes a plurality of sections 105, 108, 111, 114, 117, and each two adjacent sections are connected to each other by a flexible region 132, 134, 136, 138 that enables differential positioning of the two sections relative to the wedge-shaped flow adjuster 50. Each flexible region 132, 134, 136, 138 can advantageously comprise a narrow bendable neck, as shown in FIGS. 4-7 and 11. With respect to each pair of two adjacent sections, the flexible region 132, 134, 136, 138 between them is configured to bend in response to one of the two sections moving closer to, or further from, the flow adjuster 50 than is the other of the two sections.

Thus, the present method can involve both: i) bending a flex region 175 of the viscosity compensation device 100 about a first axis that is generally parallel to the width 235 of the coextrusion conduit 200, and ii) bending at least one of a plurality of flexible regions 132, 134, 136, 138 of the viscosity compensation device 100 about an axis lying in a plane generally orthogonal to the first axis. In such cases, by operating the actuator 110, the flex region 175 and at least one of the flexible regions 132, 134, 136, 138 simultaneously bend to adjust the profile of the coextrusion conduit 200.

When the illustrated actuator 110 is operated, at least one push/pull device 159 of the actuator moves axially, thereby changing the gap height 225 adjacent to a corresponding adjustment section 105, 108, 111, 114, 117 of the viscosity compensation device 100. In some cases, the method involves moving a first push/pull device 159 of the actuator 110 axially, thereby changing the gap height 225 adjacent to a first adjustment section 105 of the viscosity compensation device 100, and axially moving a second push/pull device 159 of the actuator, thereby changing the gap height adjacent to a second adjustment section 108 of the viscosity compensation device. As just one example, if the layer profile being extruded shows heavy end flow of the skin layer, then the outermost push/pull devices 159 can be moved so as to narrow the gap height 225 on the outer ends of the coextrusion conduit 200.

In using the illustrated feedblock 500, the actuator 110 is operated by rotating one or more of a plurality of externally-accessible profiling members 141. This causes axial movement of the respective push/pull member(s) 159. Each push/pull member 159 is attached to a respective adjustment section 105, 108, 111, 114, 117 of the viscosity compensation device 100 by virtue of a lock member 190, which embraces a shoulder 140 of the respective adjustment section. As a result, by axially moving one or more of the push/pull members 159, the respective adjustment section(s) of the viscosity compensation device 100 is/are selectively pushed or pulled, thereby deforming the viscosity compensation device such that the profile of the coextrusion conduit 200 is changed.

In some cases, the method involves bending the viscosity compensation device 100 so as to selectively narrow the gap height 225 at two outer ends of the coextrusion conduit 200. In other cases, the method involves bending the viscosity compensation device 100 so as to selectively narrow the gap height 225 at a center region of the coextrusion conduit 200.

In the embodiments described above, the invention provides a coextrusion feedblock and a method of operating the feedblock. To provide the desired adjustability of the coextrusion conduit, the illustrated feedblock 500 is equipped with a removable coextrusion profiling insert assembly 10. In another embodiment, the invention provides the insert assembly 10 itself, as will now be described. The insert assembly 10 of the present embodiment can be of the nature described above in connection with the feedblock and method embodiments. For example, the insert assembly 10 can have any of the features described above in connection with the two insert assemblies 10 shown in the feedblock 500 of FIGS. 1 and 2.

Thus, the insert assembly 10 is constructed to be mounted in a mount opening 570 of a coextrusion feedblock 500 having a housing 550, a central conduit 300, and a coextrusion conduit 200. When the insert assembly 10 is so mounted, its flow adjuster 50 is positioned between/exposed to the central conduit 300 and the coextrusion conduit 200 while the viscosity compensation device 100 is exposed to the coextrusion conduit 200. The flow adjuster 50 can be pivoted so as to simultaneously change the respective heights of the central conduit 300 and the coextrusion conduit 200 and the viscosity compensation device 100 can be adjusted to profile the coextrusion conduit 200. The insert assembly 10 can be constructed to be mounted removably in, for example, a feedblock 500 of the nature described above with reference to FIGS. 1 and 2.

The insert assembly 10 has a flow adjuster 50, a viscosity compensation device 100, and an actuator 110. Reference is made to FIGS. 4-8. When the insert assembly 10 is operably assembled, the coextrusion conduit 200 extends between the flow adjuster 50 and the viscosity compensation device 100. The viscosity compensation device 100 has a flex region 175 configured to bend, and thereby adjust a gap height 225 of the coextrusion conduit 200, in response to operation of the actuator 110. The actuator 110 preferably is adjustable to apply a force to bend the flex region 175 and thereby adjust the gap height 225 of the coextrusion conduit 200 without changing the height of the central extrusion conduit 300.

The flex region 175 of the illustrated viscosity compensation device 100 comprises a narrow bendable neck extending between two larger regions of the viscosity compensation device. This is perhaps best seen in FIGS. 4 and 6, where the two larger regions respectively comprise a base region 120 and a flow-contact region 160. The actuator 110 is configured to extend through the base region 120, and the flow-contact region 160 has a convex flow-contacting surface 165. During operation, polymer moving through the coextrusion conduit 200 contacts the exposed surface 165 of the viscosity compensation device 100.

As shown in FIGS. 6-8, the actuator 110 comprises a plurality of push/pull members 159, each extending through an elongated bore 176 in the base region 120 of the viscosity compensation device 100.

In the illustrated embodiment, the flow adjuster 50 has first and second flow-contacting surfaces. During use, the first flow-contacting surface 58 is exposed to the central conduit 300 of the feedblock 500, and the second flow-contacting surface 52 is exposed to the coextrusion conduit 200. The second flow-contacting surface 52 preferably has a concave configuration. The illustrated viscosity compensation device 100 has a convex flow-contacting surface 165 and, when the insert is operably assembled, this surface 165 is exposed to the coextrusion conduit 200 and confronts the second flow-contacting surface 52 of the flow adjuster 50. As noted above, the flow adjuster 50 preferably is wedge shaped.

As shown in FIGS. 4-7 and 11, the viscosity compensation device 100 has a plurality of sections 105, 108, 111, 114, 117 configured to be positioned along the width 235 of the coextrusion conduit 200. Due to these sections 105, 108, 111, 114, 117, the viscosity compensation device 100 is adjustable to provide profiling of the coextrusion conduit 200 such that the gap height 225 is different adjacent to different sections 105, 108, 111, 114, 117 of the viscosity compensation device.

The flow adjuster 50 and the viscosity compensation device 100 preferably are configured such that, when the insert assembly 10 is operably assembled and the gap height 225 of the coextrusion conduit 200 is different adjacent to different sections 105, 108, 111, 114, 117 of the viscosity compensation device, operating the coextrusion feedblock 500 produces a thermoplastic coextrusion structure devoid of flow lines from the wedge-shaped flow adjuster or the viscosity compensation device. To this end, the flow adjuster 50 preferably has a flow-contacting surface 52 that, during use, is exposed to the coextrusion conduit 200 and is seamless over the width 235 of the coextrusion conduit. Likewise, the viscosity compensation device 100 preferably has a flow-contacting surface 165 that, during use, is exposed to the coextrusion conduit and is seamless over the width of the coextrusion conduit. This can be accomplished, for example, when the flow adjuster 50 comprises a single integral body, which defines surface 52, spanning the width 235 of the coextrusion conduit 200, and the viscosity compensation device 100 comprises a single integral body, which defines surface 165, spanning the width of the coextrusion conduit.

The illustrated insert assembly 10 includes an actuator 110 comprising a plurality of push/pull members 159 configured to be attached to respective sections 105, 108, 111, 114, 117 of the viscosity compensation device 100. When the push/pull members are attached to the respective sections of the viscosity compensation device, a first of the push/pull members is moveable axially to selectively push or pull a first of the sections, thereby changing the gap height 225 adjacent to the first of the sections, and a second of the push/pull members is moveable axially to selectively push or pull a second of the sections, thereby changing the gap height 225 adjacent to the second of the sections. The other illustrated push/pull members 159 are configured and function the same way.

In the illustrated embodiment, the actuator 110 comprises a plurality of profiling members 141 configured to be attached to respective push/pull members 159 such that each profiling member 141 can be rotated to move the respective push/pull rod 159 axially, thereby changing the gap height 225 adjacent to respective sections 105, 108, 111, 114, 117 of the viscosity compensation device 100. As shown in FIG. 6, the profiling members 141 are configured to be attached to respective push/pull members 159, such that rotation of a given profiling member causes simultaneous rotation and axial movement of the corresponding push/pull member. In the illustrated embodiment, the profiling members 141 are hex caps mounted rotatably between the seal plate 920 and a retainer plate 980. In other cases, the profiling members can simply be formed by proximal ends of the push/pull members.

As shown in FIGS. 4-7 and 11, the illustrated viscosity compensation device 100 comprises adjacent first 105 and second 108 sections connected to each other by a flexible region 132. This flexible region 132 is configured to bend in response to the first adjustment section 105 moving closer to, or further from, the flow adjuster 50 than is the second adjustment section 108. In the illustrated embodiment, each adjacent pair of sections 105, 108, 111, 114, 117 has such a flexible region 132, 134, 136, 138. The illustrated viscosity compensation device 100 has a groove 170 with a blind bottom end 179 located between the adjacent first 105 and second 108 sections, and the flexible region 132 comprises a narrow bendable neck located at the blind bottom end of this groove. More generally, such a groove 170-173 (see FIG. 11) is provided between each adjacent pair of sections 105, 108, 111, 114, 117 in the embodiment illustrated. It is to be appreciated, however, that these details are not required.

The illustrated insert assembly 10 includes two blocks configured to be removably mounted side-by-side in the mount opening 570 of the feedblock 500. The first block 350 is the flow block, which preferably is configured to carry the flow adjuster 50. The second block is part of the viscosity compensation device 100. If desired, these two blocks can be replaced with a single block, or with more than two blocks collectively forming the desired structure.

Figure 10:
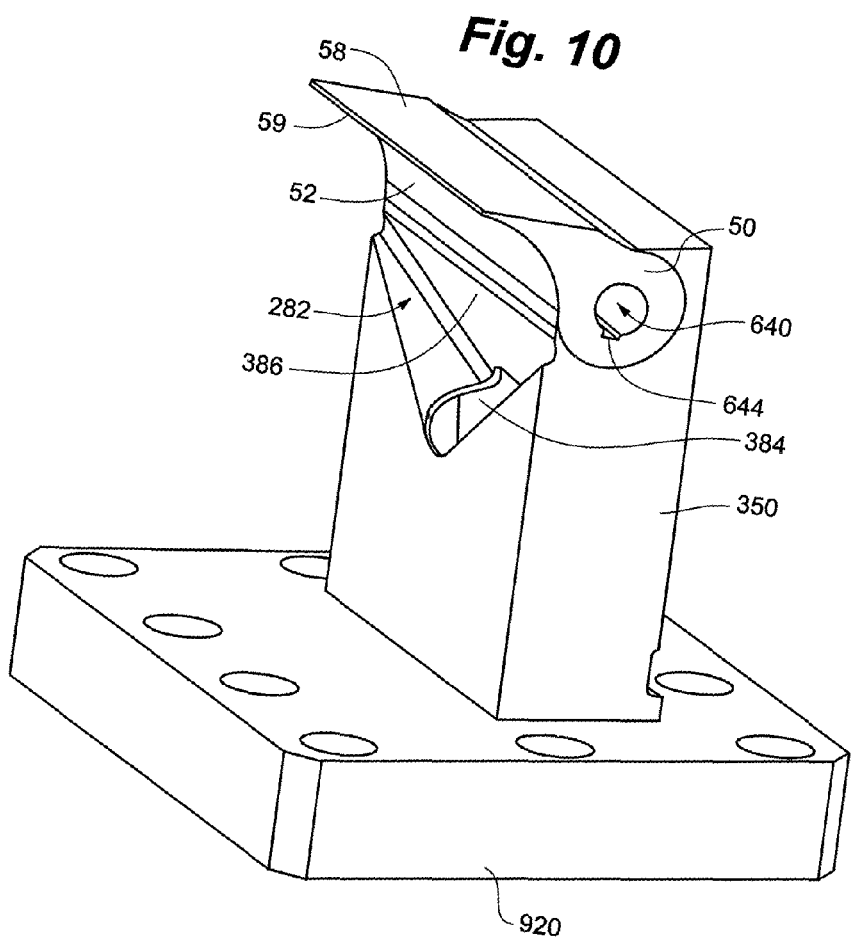
FIG. 10 is a perspective view of a flow block and a seal plate of a coextrusion profiling insert assembly in accordance with certain embodiments of the invention.

The flow blocks 350 shown in FIGS. 4 and 10 have different mechanisms for keying a control shaft 630 to the flow adjuster 50. In FIG. 4, the opening 640 in the flow adjuster 50 has a polygonal internal configuration configured to receive a control shaft 630 having a matching polygonal exterior configuration. In FIG. 10, the opening 640 in the flow adjuster 50 has a female keyway 644 configured to receive a male key on the respective control shaft.

The flow block 350 preferably has a manifold 282 that widens a flow of extrudate moving along it so as to form a sheet-like flow. In the illustrated embodiment, this manifold comprises a generally V-shaped flow section. This is shown in FIG. 10. The manifold 282 extends from a narrow input section 384 to a wide, flat section 386 from which the extrudate emanates as a flat sheet-like flow. In the illustrated embodiment, the portion of the coextrusion channel 200 that extends through the flow block 350 comprises a conduit section 240 and a subsequent manifold 282. The insert assembly 10 is thus configured to deliver a flat sheet-like extrudate flow from the manifold 282 of the flow block 350. The resulting sheet-like extrudate flow is subsequently delivered out of the inset assembly 10 so as to merge with extrudate in the central conduit 300. It is to be appreciated, however, that the flow path leading to, and past, the flow adjuster 50 can have many different configurations depending on the intended application.

The illustrated insert assembly 10 also has a seal plate 920, which is configured to be secured removably to the feedblock 500 by bolts 900 or other removable fasteners. Reference is made to FIG. 2.

While preferred embodiments of the invention have been described, it should be understood that various changes, adaptations and modifications may be made therein without departing from the spirit of the invention and the scope of the appended claims.

What is claimed is:

1. A coextrusion feedblock for producing an extrudate, said coextrusion feedblock comprising:
   an adjuster,
   a viscosity compensation device having a flex region,
   an actuator in contact with said viscosity compensation device,
   a central extrusion conduit having a height, and
   a coextrusion conduit extending between said adjuster and said viscosity compensation device, said coextrusion conduit having a gap height, a width, and a length,
   wherein said coextrusion conduit opens into said central extrusion conduit, wherein said adjuster is adjustable to simultaneously change said gap height of said coextrusion conduit and said height of said central extrusion conduit, and wherein said actuator is adjustable to apply a force to bend said flex region and thereby adjust said gap height of said coextrusion conduit without changing said height of said central extrusion conduit.

2. The coextrusion feedblock of claim 1, wherein:
   said viscosity compensation device has a base region and a flow-contact region,
   said flex region of said viscosity compensation device comprises a bendable neck extending between said base region and said flow-contact region,
   said actuator extends through said base region, and
   said flow-contact region has a convex flow-contacting surface exposed to said coextrusion conduit.

3. The coextrusion feedblock of claim 1, wherein:
   said adjuster is wedge shaped and has a first flow-contacting surface and a second flow-contacting surface,
   said first flow-contacting surface is exposed to said central extrusion conduit,
   said second flow-contacting surface is exposed to said coextrusion conduit and has a concave configuration, and
   said viscosity compensation device has a convex flow-contacting surface exposed to said coextrusion conduit and confronts said second flow-contacting surface of said adjuster.

4. The coextrusion feedblock of claim 1, wherein:
   said coextrusion feedblock has a housing and said actuator extends beyond said housing, such that said coextrusion conduit can be profiled from outside of said housing without stopping operation of said coextrusion feedblock.

5. The coextrusion feedblock of claim 1, wherein:
   said actuator comprises a plurality of push/pull members,
   said viscosity compensation device has a plurality of sections located along said width of said coextrusion conduit, and
   said plurality of sections are adjustable such that said gap height of said coextrusion conduit is different adjacent to different sections of said viscosity compensation device.

6. The coextrusion feedblock of claim 5, wherein:
   said plurality of push/pull members are attached to respective sections of said viscosity compensation device,
   a first of said push/pull members is moveable axially to selectively push or pull a first of said sections, thereby changing said gap height adjacent to said first of said sections, and
   a second of said push/pull members is moveable axially to selectively push or pull a second of said sections, thereby changing said gap height adjacent to said second of said sections.

7. The coextrusion feedblock of claim 1, wherein:
   said adjuster has a flow-contacting surface that is seamless over said width of said coextrusion conduit, and
   said viscosity compensation device has a flow-contacting surface that is seamless over said width of said coextrusion conduit.

8. The coextrusion feedblock of claim 5, wherein:
   said adjuster confronts said viscosity compensation device,
   said plurality of sections of said viscosity compensation device include adjacent first adjustment section and second adjustment section connected to each other by a flexible region, and
   said flexible region being configured to bend in response to said first adjustment section moving closer to, or further from, said adjuster than is said second adjustment section.

9. A coextrusion profiling insert assembly constructed to be mounted in a coextrusion feedblock having a central extrusion conduit with a height, said coextrusion profiling insert assembly comprising:
   a adjuster,
   a viscosity compensation device comprising a flex region, and
   an actuator,
   wherein, when said coextrusion profiling insert assembly is mounted in the coextrusion feedblock having a coextrusion conduit with a gap height extending between said adjuster and said viscosity compensation device, said actuator is adjustable to apply a force to bend said flex region and thereby adjust said gap height of said coextrusion conduit without changing said height of said central extrusion conduit,
   wherein said coextrusion conduit opens into said central extrusion conduit, and
   wherein said adjuster is adjustable to simultaneously change said gap height of said coextrusion conduit and said height of said central extrusion conduit.

10. The coextrusion profiling insert assembly of claim 9, wherein:
    said viscosity compensation device has a base region and a flow-contact region,
    said flex region of said viscosity compensation device comprises a bendable neck extending between said base region and said flow-contact region, and
    said flow-contact region has a convex flow-contacting surface.

11. The coextrusion profiling insert assembly of claim 9, wherein:
    said adjuster is wedge shaped and has a first flow-contacting surface and a second flow-contacting surface,
    said second flow-contacting surface of said adjuster has a concave configuration,
    said viscosity compensation device has a convex flow-contacting surface, and
    when said coextrusion profiling insert assembly is mounted in the coextrusion feedblock:
    i) said first flow-contacting surface of said adjuster is exposed to the central extrusion conduit of the coextrusion feedblock,
    ii) said second flow-contacting surface of said adjuster is exposed to the coextrusion conduit, and iii) said convex flow-contacting surface of said viscosity compensation device is exposed to the coextrusion conduit and confronts said second flow-contacting surface of said adjuster.

12. The coextrusion profiling insert assembly of claim 9, wherein:

said actuator comprises a plurality of push/pull members, and said viscosity compensation device has a plurality of sections and is adjustable such that the gap height of the coextrusion conduit is different adjacent to different sections of said viscosity compensation device.

13. The coextrusion profiling insert assembly of claim 12, wherein:

said plurality of push/pull members are configured to be attached to respective sections of said viscosity compensation device, a first of said push/pull members is moveable axially to selectively push or pull a first of said sections, thereby changing the gap height of the coextrusion conduit adjacent to said first of said sections, and a second of said push/pull members is moveable axially to selectively push or pull a second of said sections, thereby changing the gap height of the coextrusion conduit adjacent to said second of said sections.

14. The coextrusion profiling insert assembly of claim 9, wherein:

said adjuster has a flow-contacting surface that is seamless over a width of the coextrusion conduit, and said viscosity compensation device has a flow-contacting surface that is seamless over the width of the coextrusion conduit.

15. The coextrusion profiling insert assembly of claim 12, wherein:

said plurality of sections of said viscosity compensation device include adjacent first adjustment section and second adjustment section connected to each other by a flexible region, said flexible region configured to bend in response to said first adjustment section moving closer to, or further from, said adjuster than is said second adjustment section.

* * * * *